[19] United States Patent
Toda

[11] Patent Number: 4,964,898
[45] Date of Patent: Oct. 23, 1990

[54] DRYER SEPARATER

[75] Inventor: Junji Toda, Fujieda, Japan

[73] Assignee: Vividstar International Inc., Valinda, Calif.

[21] Appl. No.: 331,873

[22] Filed: Apr. 3, 1989

[51] Int. Cl.$^5$ .............................................. B01D 50/00
[52] U.S. Cl. ......................................... 55/337; 55/323; 55/424; 55/449
[58] Field of Search ................. 55/337, 424, 426, 423, 55/449, 323

[56] References Cited

U.S. PATENT DOCUMENTS

| | | | |
|---|---|---|---|
| 1,760,705 | 5/1930 | Ludlam | 55/449 |
| 2,755,886 | 7/1956 | Campbell | 55/423 |
| 3,402,529 | 9/1968 | Frantz | 55/337 |
| 3,824,765 | 7/1974 | Williams | 55/337 |
| 4,600,416 | 7/1986 | Mann | 55/423 |

Primary Examiner—Bernard Nozick
Attorney, Agent, or Firm—Cecilia L. Yu

[57] ABSTRACT

An improved apparatus for separating impurities from a stream of forced air by gravitational and centrifugal forces subjecting the air stream through a mesh coalescer to coalesce micro impurities of moisture or oil into large droplets which are forced through a helical passaway to condense into liquid. The separated liquid flows downwardly through a liquid protective unit into a liquid storage trap at the bottom of the device. The separated liquid when in the protective unit is free from the moving stream of forced air as latter swirls upwardly into an air filter and escape from an outlet port. The air stream once passed through the mesh coalescer, helical conduit and air filter is substantially free from any impurity.

3 Claims, 2 Drawing Sheets

DRYER SEPARATER

BACKGROUND OF THE INVENTION

Industry in this country has been demanding an ideal gas and impurity separator that can purify compressed air to provide a high velocity air stream with near zero impurity. In the past, various gas and liquid separators have been invented and used. Some of those devices utilize centrifugal force of the high velocity compressed air and the gravitational force of the condensed liquid droplets to achieve the necessary gas and liquid separation, such as the invention disclosed and claimed in the patent issued to Rodney A. William on July 23, 1974, U.S. Pat. No. 3,824,765. William's invention claimed efficient and complete separation of liquid from gas by subjecting the gas stream to centrifugal action in first one direction and then in a second opposite direction. Once gas stream traveled through the second opposite passageway, it exerted a greater certrifugal force on the entrained liquid to obtain optimum separation by having the condensed liquid collected on the built-in multiple screens and drained downwardly gravity into a quiescent zone. The liquid in the quiescent zone was free from the action of the gas stream and can freely flow into a settling tank to be drained off at a later time. Although William's patent provided an improved and more efficient gas and liquid separation over other separators, such as the one disclosed and claimed in U.S. Pat. No. 2,755,886, issued to J. A. Campbell on July 24, 1956, it only separated liquid from the gas. Impurities such as dust, fibre that are commonly found in the compressed air can not be separated by the William's device and the treated air stream coming out from such separator still contains those unwanted particles that may impair the final performance of the machine.

There are other types of separators utilizing a air filter to filter out liquid and solid contaminants from the forced air, such as the invention disclosed and claimed in the patent issued to Virgil I. Frantz on Sept. 24, 1968, U.S. Pat. No. 3,402,529 Frantz's invention provided a cyclone air filter for forced air filtered downwardly through a finned helical conduit making use of both centrifugal force and condensation of liquid in separating liquid contaminants from the air. This device should have possibly filtered out all the impure fine particles in the compressed air, but the experience shows that the filter is often clogged up with the impurities and the condensed liquid trapped inside the filter can be easily flashed out by the returning upward moving air stream that is to be released from the outlet port built opposing to the inlet port in the upper part of the housing unit. Users of this device not only can not get pure forced air, but also are required to replace the filter constantly which results high maintenance cost.

The present invention related in general to an air separator for removing moisture, dust, oil, and any other foreign matter from compressed air.

An object of this invention is to provide an air separator in which the high velocity air stream containing various impurities is passed through a mesh coalescer which results coalescence of fine liquid particles into large droplets.

Another object of the invention is to furnish a helical conduit to allow the condensed liquid droplets flow by gravity into a wind-up protective zone in the lower portion of the separator, and the liquid then can freely flows downwardly into the liquid storage trap to be drained off through a drain valve secured bottom of the separator unit.

A further object of the invention is to provide a wind-up protector that is made of multiple vertically standing 2-3 mm diameter in opening triangular tubings of high molecular weight polymer prefabricated together as one single unit. The wind-up protector has centrally inverted shape to provide room for the swirling up high velocity air to travel upwardly and thus prevent disturbance of any condensed liquid both inside the wind-up protector and in the liquid storage trap.

A further object of the invention is to provide an air filter to filter out liquid and solid contaminants from forced air travelling upwardly on the way out from the separator.

A further object of the invention is to provide an air filter assembly that can easily replace and dispose of an air filter having reached the saturation point.

SUMMARY OF THE INVENTION

An improved device for separating impurities from a stream of forced air by gravitational and centrifugal forces, in which the air stream is first passed through a mesh coalescer of fine mesh to coalesce micro impurities of moisture or oil into large droplets. The droplets of liquid are subjected to centrifugal forces of the forced air travelling through a helical passageway which causes the condensed liquid to flow downwardly through the helical conduit into a liquid protective unit at lower portion of said device. The liquid protective unit consists of multiple triangular high molecular weight polymer tubings prefabricated together standing vertically to allow the liquid droplets to flow into the tubings and downwardly by gravity into the liquid storage trap at the bottom of the device. The surface of said liquid protective unit is centrally inverted to allow said forced air to swirl upwardly into an air filter inside a center bore.

The liquid, upon entering the liquid protective unit is substantially free from the action of said moving stream of forced air as later swirls upwardly into an air filter and escapes from an outlet port.

The air filter is a cartridge of suitable size made of an extremely absorbant paper coated with a special polymer and chemical. The filter is introduced into cylindrical central inside bore of the device from the top and secured by a screw-on filter stopper. A compress spring is built onto the stopper to secure said filter that has been inserted into the inside bore. When the filter is saturated with the entrapped impurities, it can be easily replaced and disposed of by simply unscrewing and removing the filter stopper from the device, and turning the device upside down to allow the filter to slide out from the inside bore of the device.

By passing through the air filter after the air has passed through the mesh coalescer and the helical conduit, any remaining impurity especially the solid particles such as the dust and fibre in the compressed air can be further removed and the air delivered from the outlet port of the device contains near one hundred percent pure air that is free of any contaminant.

DESCRIPTION OF THE PREFERRED EMBODIMENTS

Figure 1:
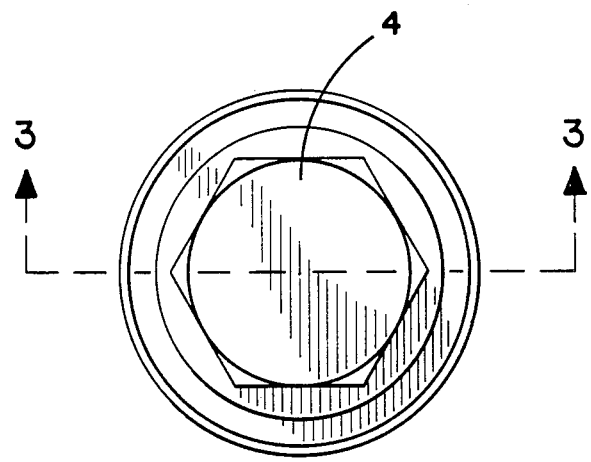
FIG. 1 is a top plain view of the present invention.
Figure 2:
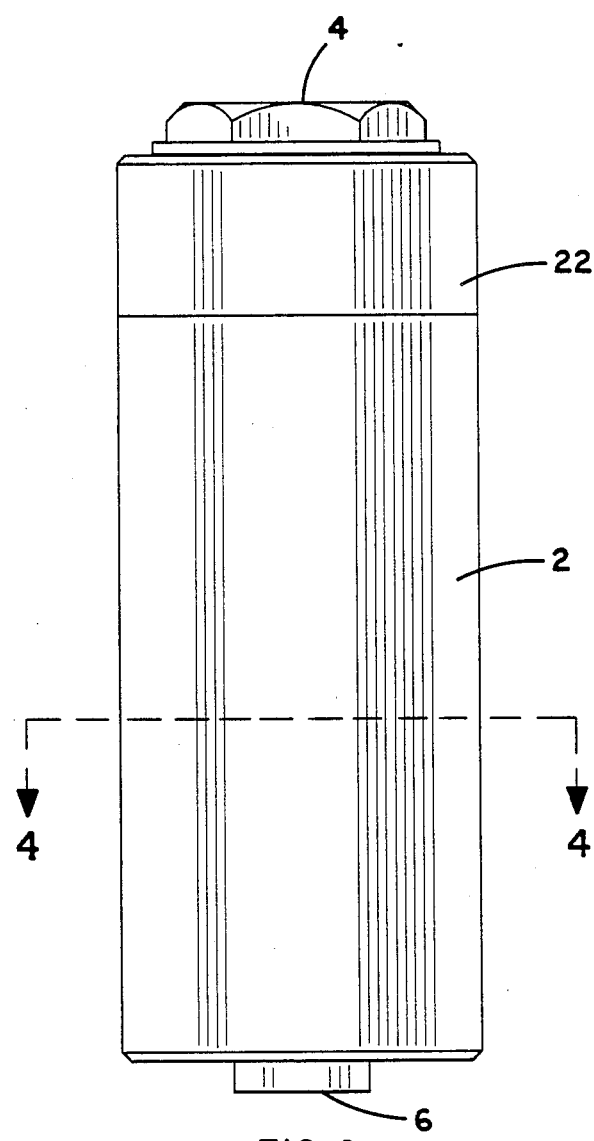
FIG. 2 is a side elevational view of the present invention.
Figure 3:
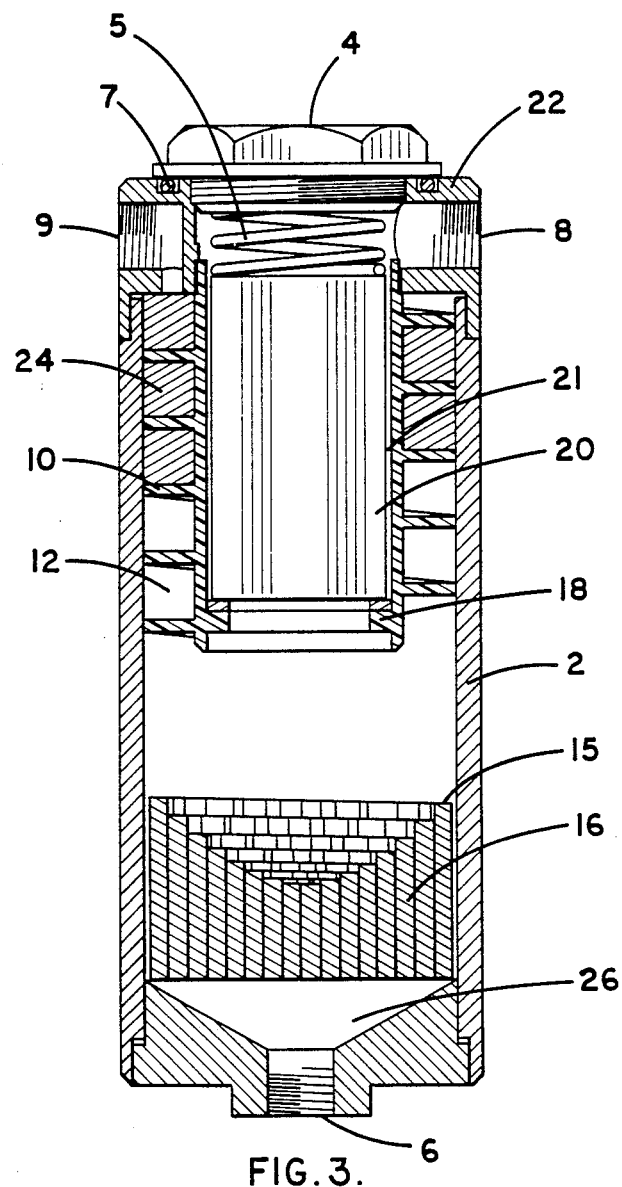
FIG. 3 is a central vertical sectional view of an embodiment of the present invention.

Reference is now made to FIGS. 1, 2 and 3 which show the preferred embodiment of the present invention as being comprised of a cylindrical housing 2, a filter stopper 4 secured on the top of the cylindrical housing 2, an inlet port 9 situated on one side of the upper portion of the housing 2 and an outlet port 8 situated on the opposite side of the upper portion of the housing 2, and a drain opening 6 at the bottom of the cylindrical housing 2.

As best shows in FIG. 3, the present invention includes a helical or spiral passageway 12 created by a spiral plate 10 surrounding or encircling a cylindrical central bore 21 and opening downwardly toward a liquid protective unit 16.

A filter end plate 18 is built at the end of the helical passage 12 to provide the seating for a filter 20 which is placed into an inside bore 21 of said housing 2, a filter stopper cap 4 is secured into the head 22 of the cylindrical housing 2. A compressed spring 5 of the filter stopper cap 4 secures an impurities filter 20 inside said cylindrical central bore 21. A rubber 0 ring 7 is used to provide a proper seal for the closure of said filter stopper car 4. The beginning two layers of the helical passage 12 is filled with mesh coalescer 24, a drainage opening 6 to receive a ball valve or other suitable valve is built at center bottom of the cylindrical housing 2 to allow drainage of condensed liquid from liquid storage trap.

Dirty forced air from an air compress or enters into said helical passageway 12 through an inlet port 6 into the device. The inlet port opens inwardly onto the upper end of the helical passage 12 to introduce the forced air into the helical passage 12 to travel through a mesh coalescer 24. The fine particles of moisture or other liquid coalesces into large droplets which by their gravity drop onto the lower layer of the spiral plate 10 and flow downwardly along the helical passageway 12 into a liquid protective unit 16 situated at the end of the helical passageway 12. The condensed liquid then flows passing through the vertical triangular tubings 15 of the liquid protective unit 16 and rests at the bottom cavity of said device. The condensed liquid can be drained off through the drainage opening 6 at a later time. The forced air once passed through the helical passageway 12 would swirl upwardly into a impurities filter 20 that filters out any remaining impurity especially those fine solid particles such as dust or fibre material that has not been separated by the centrifugal and gravitational forces.

Figure 4:
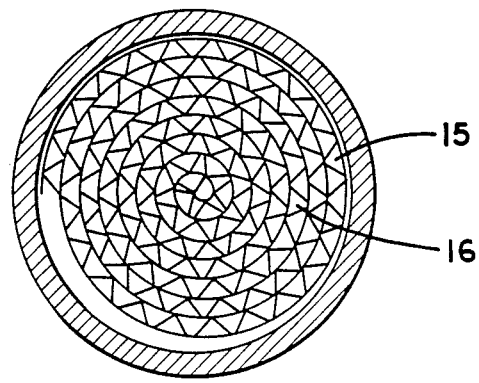
FIG. 4 is a horizontal sectional view taken along lines 4—4 of FIG. 2 of the present invention.

The unique function of the liquid protective unit 16 within the present invention is further illustrated in FIG. 4 showing a multiple micro-diameter triangular tubings of high molecular weight polymer prefabricated together to provide a quiescent zone for the condensed liquid once the later enters into said liquid protective unit 16. Because of the small opening of each tubing, the high velocity forced air exerts no disturbing effect on the condensed liquid once said liquid flows into said liquid protective unit 16; the forced air when swirls back into said impurities filter 20 would not flash out any liquid from the liquid protective unit 16.

In the foregoing specification, specific embodiments of the present invention have been set forth in detail. It will be apparent, however, to those skilled in the art that many of these details can be varied without departing from the spirit of the present invention. Accordingly, this invention is to be limited only by the scope of the appended claims.

What is claimed is:

1. An improved air filtering device for separating liquid and solid impurities from a stream of forced air, which comprises.
   a housing,
   a cylindrical central bore in said housing,
   an impurities air filtering element inserted into and seated in said cylindrical central bore,
   a spiral plate surrounding and encircling said cylindrical central bore thereby defining a downwardly directed helical passageway,
   a mesh coalescer filled inside said helical passageway,
   a liquid protective unit seated in a lower part of said housing below said cylindrical central bore,
   a contaminant cavity in the lower part of said housing below said liquid protective unit,
   a drainage opening for draining liquid contaminants from said contaminant cavity,
   Said helical passageway connecting at its upper end with an inlet port of said housing, and at its lower end with said liquid protective unit, and directing a stream of forced air downwardly from said inlet port through said mesh coalescer and coalescently, centrifugally and gravitationally separating liquid contaminants from said forced air, and collecting said liquid contaminant through said liquid protective unit into said contaminant cavity, an outlet port in an upper part of said housing above said air filtering clement allowing said forced air to escape upwardly from said housing.

2. An improved air filtering device as claimed on claim 1, wherein an impurities air filter element is disposally placed inside said cylindrical central bore, said filter element is made of high molecular weight polymer and highly absorbent paper for filtering said upwardly moving forced air of solid impurities.

3. An improved air filtering device as claimed in claim 1, wherein said liquid protective unit is made of multiple triangular tubings standing vertically at lower portion of said housing having a central inverted surface to provide room for said forced air to swirl upwardly through said filter element inside said cylindrical central bore to said outlet port of said housing.

* * * * *